United States Patent
Nakamura (10) Patent No.: US 8,212,895 B2
(45) Date of Patent: Jul. 3, 2012

(54) DIGITAL CAMERA SYSTEM WITH PORTRAIT EFFECT

(75) Inventor: Kenji Nakamura, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 381 days.

(21) Appl. No.: 12/185,387

(22) Filed: Aug. 4, 2008

(65) Prior Publication Data

US 2009/0040321 A1  Feb. 12, 2009

(30) Foreign Application Priority Data

Aug. 10, 2007  (JP) .................. 2007-210081

(51) Int. Cl.
  H04N 5/262 (2006.01)
  H04N 5/222 (2006.01)
(52) U.S. Cl. .................. 348/239; 348/333.02
(58) Field of Classification Search ............. 348/208.12, 348/208.14, 208.16, 230.1, 239, 333.02, 348/333.03; 382/255
  See application file for complete search history.

(56) References Cited

U.S. PATENT DOCUMENTS

| | | | |
|---|---|---|---|
| 6,560,374 B1 * | 5/2003 | Enomoto | 382/284 |
| 6,577,819 B2 * | 6/2003 | Yamaguchi | 396/55 |
| 7,692,696 B2 * | 4/2010 | Steinberg et al. | 348/239 |
| 2002/0060739 A1 * | 5/2002 | Kitamura et al. | 348/222 |
| 2002/0094200 A1 * | 7/2002 | Yamaguchi | 396/55 |
| 2002/0191100 A1 * | 12/2002 | Matsunaga et al. | 348/345 |
| 2009/0096897 A1 * | 4/2009 | Saito | 348/241 |
| 2010/0053349 A1 * | 3/2010 | Watanabe et al. | 348/222.1 |

FOREIGN PATENT DOCUMENTS

| | | |
|---|---|---|
| JP | 5-241064 | 9/1993 |
| JP | 11-224324 | 8/1999 |
| JP | 2001-45359 | 2/2001 |
| JP | 2002-218312 | 8/2002 |
| JP | 2003-209727 | 7/2003 |
| JP | 2005-39680 | 2/2005 |
| JP | 2006-128754 | 5/2006 |
| JP | 2006-319782 | 11/2006 |
| JP | 2007-66199 | 3/2007 |
| JP | 2007-96455 | 4/2007 |
| WO | WO2007043575 | * 4/2007 |
| WO | WO2007049634 | * 5/2007 |

OTHER PUBLICATIONS

Office Action mailed Jan. 10, 2012, in Japanese Patent Application No. 2007-210081, filed Aug. 10, 2007 (with partial English language translation).

* cited by examiner

*Primary Examiner* — Albert Cutler (74) *Attorney, Agent, or Firm* — Oblon, Spivak, McClelland, Maier & Neustadt, L.L.P.

(57) ABSTRACT

The present invention provides a technique capable of generating an image having a portrait effect without complicating a configuration of a digital camera system. An image capturing apparatus has an optical system including a zoom lens, a correction lens, and a focus lens; and an image sensor for converting subject light which is incident via the optical system into an electric signal. The image capturing apparatus captures a blurred image in which a blurring is generally caused intentionally by changing a relative positional relation between any one of the zoom lens, the correction lens, and the focus lens and the image sensor, and also captures a normal image in which a blurring is not caused intentionally. An image processing apparatus combines the normal image and the blurred image, thereby generating a composite image having a no-blurring area in which a blurring is not intentionally caused and a blurred area in which a blurring is intentionally caused.

23 Claims, 10 Drawing Sheets

DIGITAL CAMERA SYSTEM WITH PORTRAIT EFFECT

BACKGROUND OF THE INVENTION

1. Field of the Invention

The present invention relates to a digital camera system having an image capturing apparatus for capturing an image and an image processing apparatus for performing an imaging process on an image captured by the image capturing apparatus.

2. Description of the Background Art

Hitherto, various techniques related to digital camera systems have been proposed. For example, in Japanese Patent Application Laid-Open No. 11-224324, an image processing technique capable of obtaining a portrait picture with a blurred background even by a small, inexpensive, single-focus camera is proposed.

In the technique of Japanese Patent Application Laid-Open No. 11-224324, a blurred image is generated by the image processing technique in order to obtain a portrait picture. Consequently, the circuit scale of an image processing apparatus is very large, and a configuration of a digital camera system is complicated.

SUMMARY OF THE INVENTION

An object of the present invention is to provide a technique capable of generating an image having a portrait effect without complicating a configuration of a digital camera system.

According to the present invention, a digital camera system includes an image capturing apparatus for capturing an image, and an image processing apparatus for performing an imaging process on an image captured by the image capturing apparatus. The image capturing apparatus has an optical system including a lens and an image sensor for converting subject light incident via the optical system into an electric signal. The image capturing apparatus captures a blurred image in which a blurring is generally caused intentionally by changing a relative positional relation between the lens and the image sensor and also captures a normal image in which a blurring is not caused intentionally. The image processing apparatus combines the normal image and the blurred image, thereby generating a composite image having a no-blurring area in which a blurring is not intentionally caused and a blurred area in which a blurring is intentionally caused.

Since a blurred image is generated by using a function of changing the relative positional relation between the lens and the image sensor which are provided for a general digital camera system, unlike a case of generating a blurred image by the image processing technique, a blurred image can be generated without complicating the configuration of the digital camera system. Therefore, an image having the portrait effect can be generated with a simple configuration.

According to one aspect of the present invention, the capturing apparatus has a camera-shake correcting mechanism for performing a camera-shake correction by moving either the lens or the image sensor in a plane perpendicular to an optical axis, and captures the blurred image by using the camera-shake correcting mechanism.

According to another aspect of the present invention, the camera-shake correcting mechanism moves either the lens or the image sensor in the plane so that relative speed between the lens and the image sensor changes in an exposure period for capturing the blurred image.

In an exposure period for capturing the blurred image, since one of the lens and the image sensor is moved in the plane perpendicular to the optical axis so that the relative speed between the lens and the image sensor changes, the degree of blurring can be changed in a single blurred image. Therefore, various blurred images can be captured, and various images having the portrait effect can be generated.

According to another aspect of the present invention, the image processing apparatus further includes an operating part for designating a partial area in the normal image, which is to be the no-blurring area.

Since an area which is to be the no-blurring area in a normal image can be set, a composite image desired by a user can be easily generated.

According to another aspect of the present invention, the digital camera system further includes a display portion for displaying a whole subject whose image is taken by the image capturing apparatus. When the normal image is captured by the image capturing apparatus, in a state where the whole subject is displayed, the display portion displays a designation area for designating a partial subject whose image area in the normal image is to be the no-blurring area.

With reference to a display image of the display portion, a no-blurring area in a normal image can be visually recognized.

According to another aspect of the present invention, the digital camera system further includes an operating part for changing at least one of position and range of the designation area displayed on the display portion.

In a state where the whole subject is displayed on the display portion, a partial subject whose image area in the normal image is to be the no-blurring area can be set by the operating part. Consequently, a no-blurring area can be set while visually recognizing an area in a normal image, which is to be a no-blurring area. Therefore, a composite image desired by the user can be generated easily.

According to another aspect of the present invention, the digital camera system further includes a display portion for displaying an image captured by the image capturing apparatus. The display portion displays a designation area for designating an area which is to be the no-blurring area in the normal image in a state where the normal image is displayed. The system further includes an operating part for changing at least one of position and range of the designation area displayed on the display portion.

Since an area which is to be a no-blurring area can be set by the operating part in a state where a normal image is displayed on the display portion, a no-blurring area can be set while visually recognizing an area in a normal image, which is to be a no-blurring area. Therefore, a composite image desired by the user can be generated easily.

According to another aspect of the present invention, the image processing apparatus sets a pre-set fixed area in the normal image as the no-blurring area.

According to another aspect of the present invention, the image processing apparatus decreases a composition ratio of the normal image when combined with the blurred image, with distance from the area which is to be the no-blurring area in the normal image.

A composite image having a natural portrait effect that the degree of blurring gradually increases from a no-blurring area can be generated.

According to another aspect of the present invention, the digital camera system further includes an operating part for designating an overlap position between the normal image and the blurred image on generating the composite image in the image processing apparatus.

Since the overlap position between a normal image and a blurred image on generating a composite image can be designated by the operating part, a composite image desired by the user can be generated easily.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
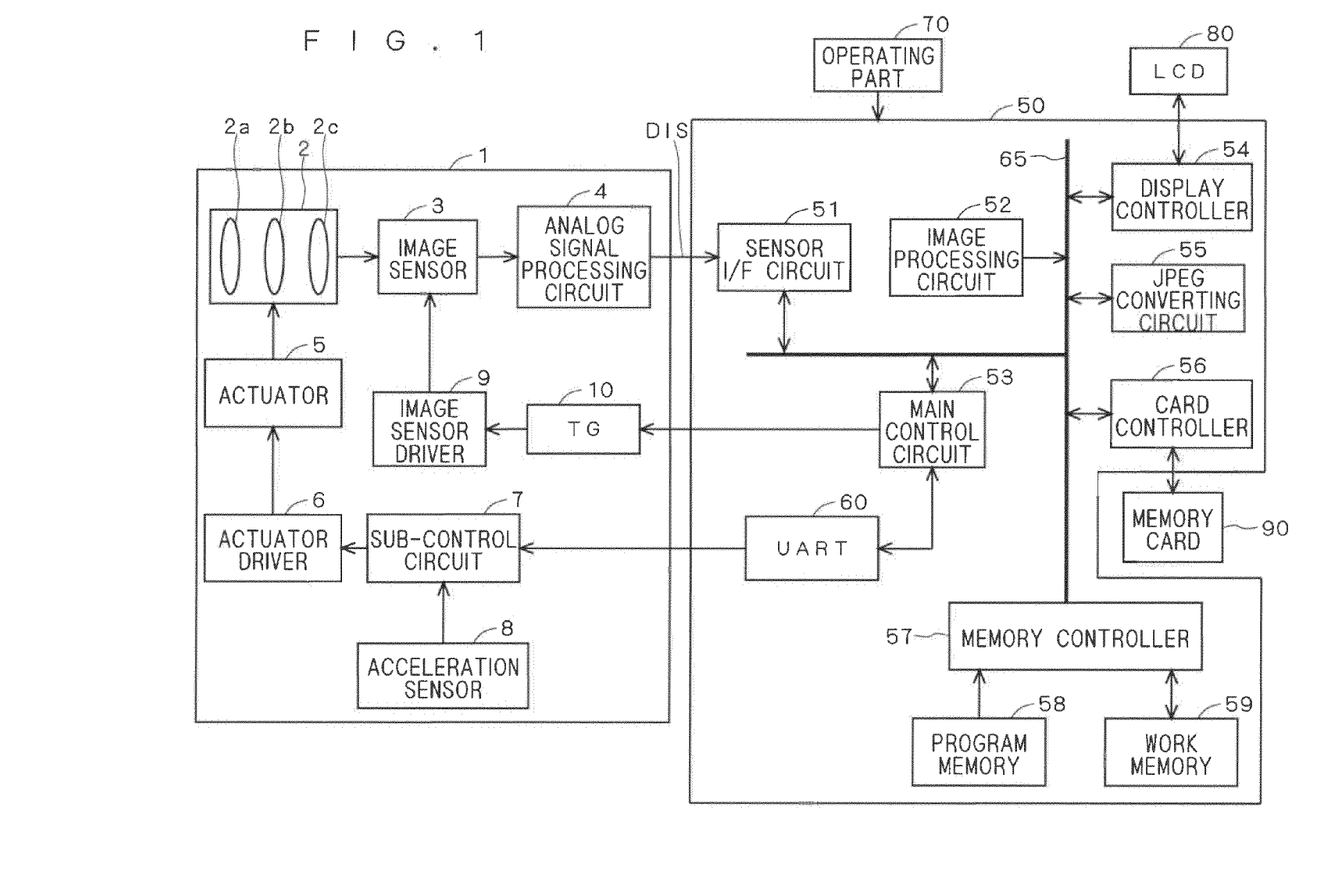
FIG. 1 is a block diagram showing a configuration of a digital camera system according to a first embodiment of the present invention.

FIG. 1 is a block diagram showing a configuration of a digital camera system according to a first embodiment of the present invention. The digital camera system according to the first embodiment is, for example, a digital still camera and includes, as shown in FIG. 1, an image capturing apparatus 1 for capturing an image, an image processing apparatus 50 for performing an imaging process on an image captured by the image capturing apparatus 1, an operating part 70 operated by a user, an LCD (Liquid Crystal Display) 80 for displaying the image subjected to the imaging process in the image processing apparatus 50, and a memory card 90 for storing the image subjected to the imaging process in the image processing apparatus 50.

The image capturing apparatus 1 includes an optical system 2, an image sensor 3, an analog signal processing circuit 4, an image sensor driver 9, and a timing generator (hereinbelow, referred to as "TG") 10. The image capturing apparatus 1 further includes an actuator 5, an actuator driver 6, a sub-control circuit 7, and an acceleration sensor 8.

The optical system 2 includes a zoom lens 2a, a correction lens 2b, and a focus lens 2c. Subject light passes through the lenses and is incident on the image capturing surface of the image sensor 3. The image sensor 3 is, for example, a CCD. The image sensor 3 converts the incident subject light into an electric signal to capture an image, and outputs the captured image as an analog image signal. The image capturing apparatus 1 employs an electronic shutter method. The image sensor 3 may be a CMOS sensor.

The analog signal processing circuit 4 performs a CDS (Correlated Double Sampling) process for eliminating noise components on the image signal output from the image sensor 3, and then performs an A/D converting process, thereby generating a digital image signal DIS. The image sensor driver 9 drives the image sensor 3 based on a timing signal output from the TG 10.

The actuator 5 can individually move each of the zoom lens 2a, the correction lens 2b, and the focus lens 2c included in the optical system 2. The actuator driver 6 drives the actuator 5 in accordance with an instruction of the sub-control circuit 7.

Figure 2:
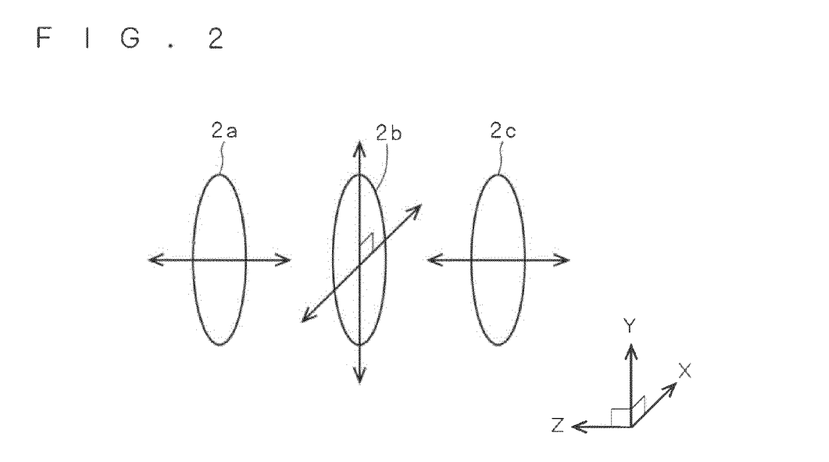
FIG. 2 is a diagram showing movement directions of lenses of an optical system according to the first embodiment of the present invention.

FIG. 2 is a diagram showing movement directions of the zoom lens 2a, the correction lens 2b, and the focus lens 2c. An X-axis direction and a Y-axis direction shown in FIG. 2 are a direction parallel to a horizontal direction (row direction) of an image capture plane of the image sensor 3 and a direction parallel to a vertical direction (column direction) of the image capture plane, respectively. A Z-axis direction shows the optical axis direction.

As shown in FIG. 2, each of the zoom lens 2a and the focus lens 2c can move in the Z-axis direction. The correction lens 2b can move independently in each of the X-axis direction and the Y-axis direction. That is, the correction lens 2b can move in an XY plane parallel to the image capturing plane, in other words, in the XY plane perpendicular to the optical axis.

In the digital camera system according to the first embodiment of the present invention, a zooming process is performed by moving the zoom lens 2a in the Z-axis direction, and an autofocus process is performed by moving the focus lens 2c in the Z-axis direction. By moving the correction lens 2b in at least one of the X-axis direction and the Y-axis direction, correction on camera-shake of a photographer, that is, camera-shake correction is made.

The acceleration sensor 8 individually detects accelerations in the X-axis and Y-axis directions in the digital camera system. The sub-control circuit 7 controls the actuator driver 6 based on the accelerations in the X-axis and Y-axis directions detected by the acceleration sensor 8. Because of this, the correction lens 2b moves in accordance with the detection result of the acceleration sensor 8. Thus, camera-shake correction is performed.

The image processing apparatus 50 includes a sensor I/F circuit 51, an image processing circuit 52, a main control circuit 53, a display controller 54, a JPEG converting circuit 55, a card controller 56, and a memory controller 57 which are connected to a bus 65. Further, the image processing apparatus 50 has a program memory 58, a work memory 59, and a UART (Universal Asynchronous Receiver Transmitter) 60.

The memory controller 57 reads data from the program memory 58 and reads/writes data from/to the work memory 59. The main control circuit 53 is constituted of a CPU or the like and controls the entire operation of the image processing apparatus 50 in a centralized manner. The CPU in the main control circuit 53 executes an operation program which is pre-stored in the program memory 58. The TG 10 in the image capturing apparatus 1 is controlled by the main control circuit 53. The UART 60 performs asynchronous serial communication with the sub-control circuit 7 in the image capturing apparatus 1. The main control circuit 53 performs communication with the sub-control circuit 7 via the UART 60.

The sensor I/F circuit 51 outputs the image signal DIS from the image capturing apparatus 1 to the memory controller 57 via the bus 65. The memory controller 57 stores the input image signal DIS to the work memory 59. From the image capturing apparatus 1, the image signal DIS in a Bayer format is output.

The image processing circuit 52 reads the image signal DIS in the Bayer format from the work memory 59 via the memory controller 57, performs various corrections such as black level correction on the image signal DIS, and further performs various filtering processes such as sharpness process. The image processing circuit 52 converts the image signal DIS in the Bayer format subjected to the various processes to an image signal in a YUV format, and stores the image signal in the YUV format into the work memory 59 via the memory controller 57. Hereinafter, the image signal DIS in the YUV format will be referred to as "YUV image signal DIS". Further, the image processing circuit 52 reads the YUV image signals DIS of a plurality of images from the work memory 59 via the memory controller 57 and combines a plurality of images indicated by the YUV image signal DIS, thereby generating a composite image. The image processing circuit 52 stores a composite image signal indicative of the generated composite image into the work memory 59 via the memory controller 57. The image composing method will be later described in detail.

The JPEG converting circuit 55 reads the YUV image signal DIS or the composite image signal from the work memory 59 via the memory controller 57, performs a JPEG compressing process on the signal, and stores the signal subjected to the compressing process to the work memory 59 via the memory controller 57.

The card controller 56 reads the compressed YUV image signal DIS or the compressed composite image signal via the memory controller 57 and stores the read signal into the memory card 90. The display controller 54 reads the YUV image signal DIS before compression or the composite image signal before compression via the memory controller 57 and drives the LCD 80 based on the read signal. As a result, the image captured by the image capturing apparatus 1 or the composite image generated by the image processing circuit 52 is displayed on the LCD 80.

The operating part 70 has various operation buttons such as a release button and a zoom button. When an operation button in the operating part 70 is pressed, the operation information is input to the main control circuit 53, and the main control circuit 53 performs an operation according to the input operation information.

Figure 3:
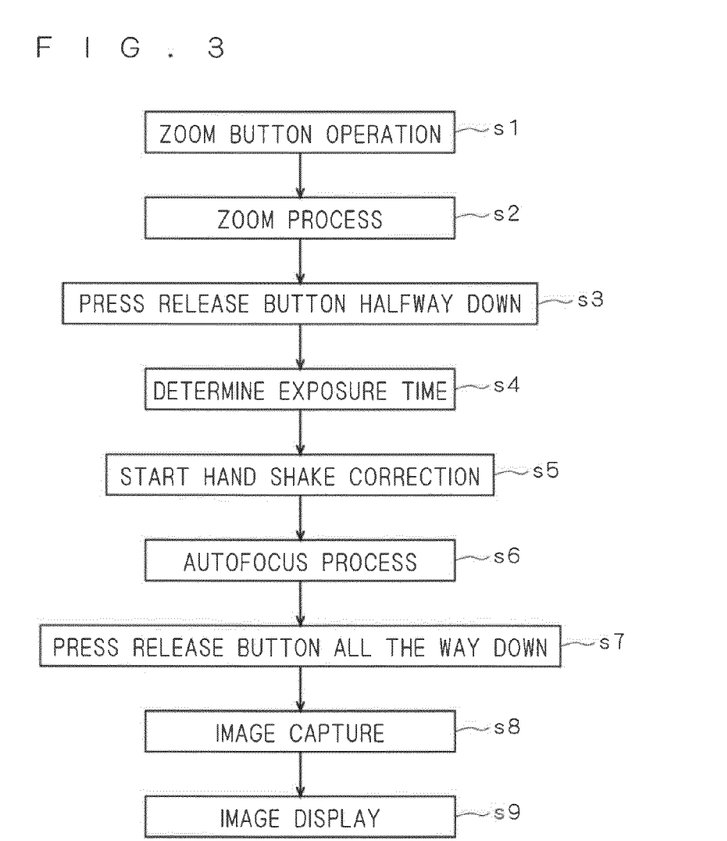
FIG. 3 is a flowchart showing an image capturing process of the digital camera system according to the first embodiment of the present invention.

Next, a series of operations at the time of capturing an image in the digital camera system of the first embodiment will be described. FIG. 3 is a flowchart showing the operations. As shown in FIG. 3, in step s1, when the photographer operates the zoom button in the operating part 70 while pointing the digital camera system at the subject, the operation information is input to the main control circuit 53. When the subject light enters the optical system 2, the display controller 54 drives the LCD 80 based on the generated YUV image signal DIS to display the subject to be imaged on the LCD 80.

In step s2, the main control circuit 53 determines a movement amount and a movement direction of the zoom lens 2a in accordance with the input operation information and notifies them to the sub-control circuit 7 in the image capturing apparatus 1 via the UART 60. The sub-control circuit 7 notifies the actuator driver 6 of an instruction of moving the zoom lens 2a only by the notified movement amount in the notified movement direction, and the actuator driver 6 drives the actuator 5 in accordance with the instruction. As a result, according to the zooming operation on the operating part 70 of the photographer, the zoom lens 3a is moved in the Z-axis direction by the actuator 5. By the operation, the angle of view changes and the zoom process is performed.

When the photographer presses the release button halfway down in the operating part 70 in step s3, the operation information is input to the main control circuit 53. The main control circuit 53 determines exposure time necessary for the image capturing apparatus 1 in step s4. For example, the main control circuit 53 determines optimum exposure time based on illuminance of image capture environment obtained by a not-shown illuminance sensor provided for the digital camera system and performance information of the image sensor 3 which is pre-stored in the program memory 58.

In step s5, the main control circuit 53 notifies the sub-control circuit 7 of start of the camera-shake correction via the UART 60, and the sub-control circuit 7 sequentially drives the actuator 5 via the actuator driver 6 based on a detection result of the accelerator sensor 8. By the driving, the correction lens 2b moves in the XY plane so as to cancel the influence of the camera-shake, and the subject light from the optical system 2 always enters the image capture face of the image sensor 3 at almost predetermined angle.

In step s6, the autofocus process is performed. In step s6, first, the main control circuit 53 controls the TG 10 to make the image sensor driver 9 drive the image sensor 3. After that, the main control circuit 53 reads the generated YUV image signal DIS from the work memory 59 and obtains a contrast of an image indicated by the read YUV image signal DIS. The main control circuit 53 determines the movement amount of the focus lens 2c based on the obtained contrast. That is, the main control circuit 53 obtains the movement amount of the focus lens 2c so that the contrast of the still picture captured by the image capturing apparatus 1 becomes the maximum. The main control circuit 53 notifies the sub-control circuit 7 of the movement amount of the focus lens 2c via the UART 60. The sub-control circuit 7 instructs the actuator driver 6 to move the focus lens 2c only by the notified movement amount, and the actuator driver 6 drives the actuator 5 in accordance with the instruction. By the driving, the focus lens 2c moves in the Z-axis direction, and the focus of the subject light from the optical system 2 is set to the optimum position. In such a manner, the autofocus process is performed.

When the release button in the operating part 70 is pressed all the way down in step s7, the main control circuit 53 controls the TG 10 based on the exposure time determined in step s4 to make the image sensor driver 9 drive the image sensor 3. In the image sensor 3, charges are accumulated for time according to the exposure time determined in step s4, and the accumulated charges are converted to an electric signal. As a result, an image captured in the optimum exposure time is obtained, and an analog image signal indicative of the image is generated. The generated analog image signal is converted to a digital image signal DIS by the analog signal processing circuit 4. Then, the image signal DIS is converted to the YUV image signal DIS by the image processing circuit 52. The generated YUV image signal DIS is JPEG compressed by the JPEG converting circuit 55, and the compressed signal is stored in the work memory 59 and also in the memory card 90. The YUV image signal DIS before compression is then read from the work memory 59 by the display controller 54, and an image indicated by the YUV image signal DIS is displayed on the LCD 80. In such a manner, the still image captured by the image capturing apparatus 1 is displayed on the LCD 80.

As described above, in the digital camera system, the autofocus process and the camera-shake correction are performed and an image is captured. Consequently, an image in which a blurring is suppressed can be generated.

Next, an image composing process in the digital camera system in the first embodiment will be described. In the digital camera system, a blurred image BI in which a blurring is intentionally caused overall and a normal image NI in which a blurring is not intentionally caused are captured. By composing the images, a composite image CI having a no-blurring area in which a blurring is not intentionally caused and a blurred area in which a blurring is intentionally caused is generated. As a result, an image having the portrait effect, for example, an image in which only a background is blurred can be generated. In a case where a blurring occurs in a captured image although some process for suppressing occurrence of a blurring such as the autofocus process and the camera-shake correction is performed, since the blurring is not caused intentionally, such an image is not included in the blurred image BI, but is included in the normal image NI. The operation of the digital camera system on generating the composite image CI will be described below.

Figure 4:
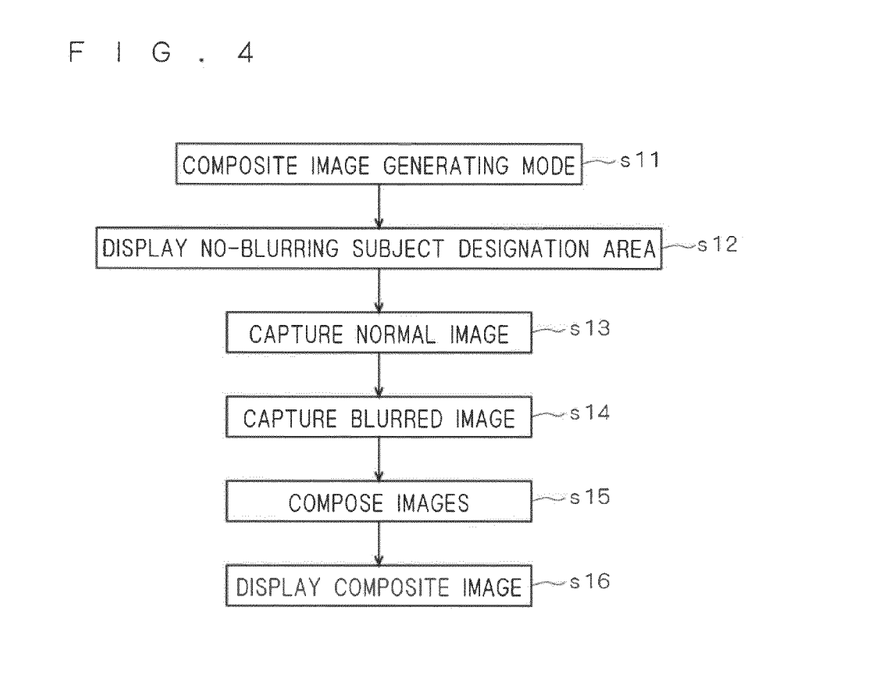
FIG. 4 is a flowchart showing a composite image generating process of the digital camera system according to the first embodiment of the present invention.

FIG. 4 is a flowchart showing a series of operations of the digital camera system on generating the composite image CI. In the digital camera system of the first embodiment, by a single press of the release button, the normal image NI and the blurred image BI are continuously captured and automatically composed, and the composite image CI is displayed on the LCD 80. Therefore, in the example, the normal image NI and the blurred image BI of the same subject are basically generated.

Figure 5:
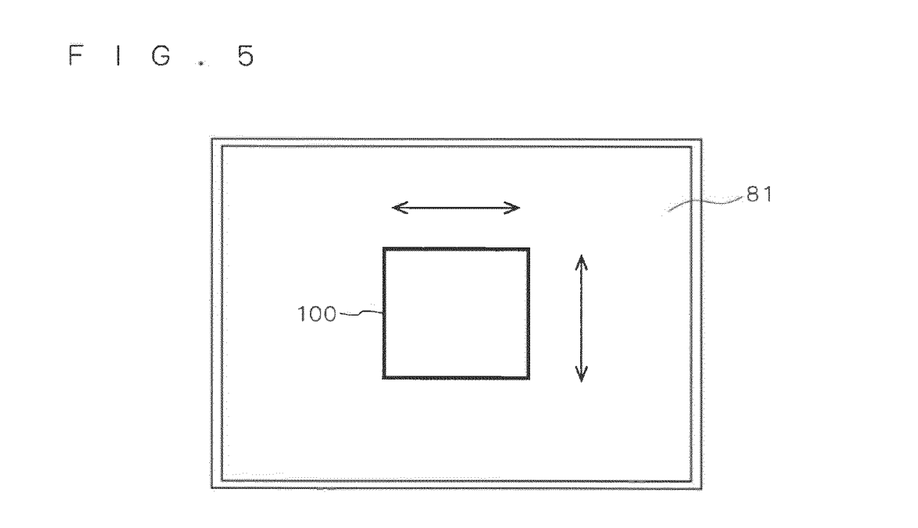
FIG. 5 is a diagram showing a display example of a no-blurring subject designation area.

As shown in FIG. 4, when a predetermined operation is performed on the operating part 70 in step s11, the digital camera system enters a composite image generating mode. When the digital camera system is in the composite image generating mode, in step s12, the main control circuit 53 displays a no-blurring subject designation area 100 on a display screen 81 of the LCD 80 via the display controller 54. FIG. 5 is a diagram showing the state.

In the first embodiment, at the time of generating the composite image CI, an area in the normal image NI is set as a no-blurring area in the composite image CI. The no-blurring subject designation area 100 is an area for designating a partial subject whose image area in the normal image NI is to be a no-blurring image from the entire subject displayed on the LCD 80. That is, the image of the partial subject displayed in the no-blurring subject designation area 100, captured without intentionally causing a blurring becomes the no-blurring area in the composite image CI.

In the first embodiment, the position and the range of the no-blurring subject designation area 100 can be changed by operating the operating part 70. The main control circuit 53 changes the position and the range of the no-blurring subject designation area 100 in accordance with the operation information from the operating part 70. Therefore, the photographer can freely set the partial subject whose image area in the normal image NI is to be a no-blurring area in the composite image CI in the whole subject displayed on the LCD 80. By operating the operating part 70, therefore, an area which is to be a no-blurring image in the normal image NI can be designated. If at least one of the position and the range of the no-blurring subject designation area 100 can be changed, a partial subject whose image is to be a no-blurring area can be designated freely to some degree.

Figure 6:
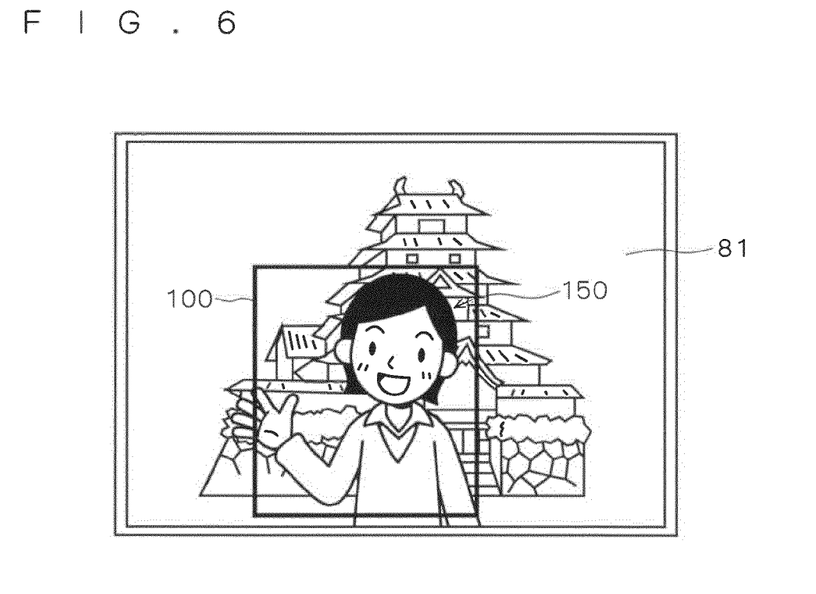
FIG. 6 is a diagram showing a display example of a subject and a no-blurring subject designation area.

In step s13, the normal image NI is captured. In step s13, when the photographer points the digital camera system at the subject, the subject is displayed on the display screen 81 of the LCD 80. By an operation on the operating part 70 of the photographer, a partial subject whose image is desired to be free from a blurring in the composite image CI is set in the no-blurring subject designation area 100. FIG. 6 is a diagram showing an example of the state. In the example of FIG. 6, a person 150 is displayed in the no-blurring subject designation area 100, so that the image area of the person 150 in the normal image NI to be captured later becomes a no-blurring area in the composite image CI. As a result, the composite image CI includes the image of the person 150 in which a blurring is not intentionally caused.

Then, when the release button is pressed halfway down, in a manner similar to the flowchart shown in FIG. 3, determination of the exposure time, start of the camera-shake correction, and the autofocus process are executed. Next, when the release button is pressed all the way down, an image is captured with the determined exposure time. The captured image is the normal image NI.

Figure 8:
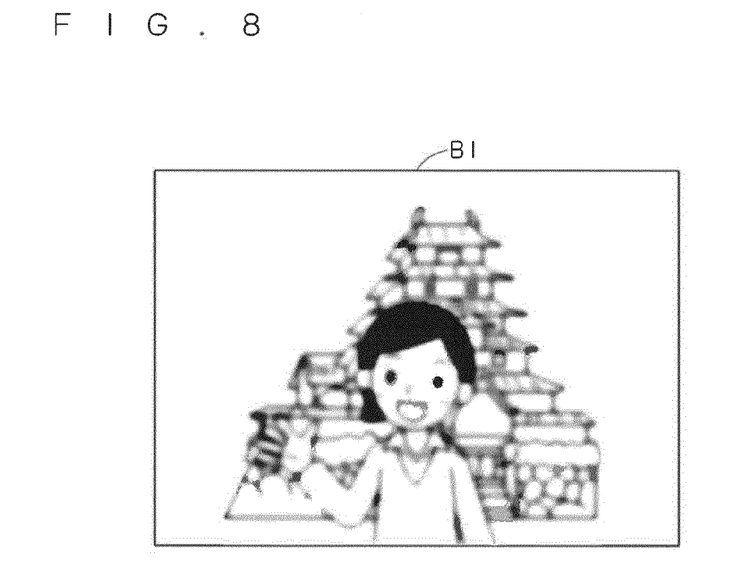
FIG. 8 is a diagram showing an example of a blurred image.

When the normal image NI is captured in step s13, subsequently, the blurred image BI is captured in step s14. FIG. 8 is a diagram showing an example of the blurred image BI. As shown in FIG. 8, a blurring occurs entirely in the blurred image BI.

In step s14, the main control circuit 53 notifies the sub-control circuit 7 of capture of the blurred image BI and controls the TG 10 to make the image sensor driver 9 drive the image sensor 3. In the image capturing apparatus 1, by changing the relative positional relation between the lens included in the optical system 2 and the image sensor 3, the blurred image BI is captured. For example, by using a camera-shake correcting mechanism constituted of the actuator 5, the actuator driver 6, the sub-control circuit 7, and the accelerator sensor 8, the blurred image BI can be captured. As described above, at the time of performing camera-shake correction, the correction lens 2b is moved according to the detection result of the acceleration sensor 8 in the exposure period. At the time of capturing the blurred image BI, without using the detection result of the acceleration sensor 8, the camera-shake correcting mechanism moves the correction lens 2b at random in the XY plane in the exposure period. In such a manner, a blurring can be intentionally caused in a captured image, and the blurred image BI in which a blurring occurs entirely can be obtained.

As another example, by moving the focus lens 2c to adjust the relative positional relation between the focus lens 2c and the image sensor 3, a defocus state is intentionally obtained. By capturing an image in the state, a blurring can be caused intentionally in an entire captured image, so that the blurred image BI can be obtained. Also by moving the focus lens 2c during the exposure period, a defocus state is achieved during exposure, and the blurred image BI can be obtained.

As another example, by moving the zoom lens 2a in the Z-axis direction during the exposure period, that is, by performing the zoom process in the exposure period, a blurring can be caused intentionally in an entire captured image, and the blurred image BI can be captured.

In a case of capturing the blurred image BI by moving the lens included in the optical system 2 in the exposure period, considering time necessary to move the lens, the exposure time at the time of capturing the blurred image BI is set to be longer than the exposure time at the time of capturing the normal image NI.

In the above example, the blurred image BI is captured subsequent to the capture of the normal image NI. It is also possible to capture the normal image NI subsequent to the capture of the blurred image BI.

After the normal image NI and the blurred image BI are captured, both of the images are composed in step s15. In step s15, first, the image processing circuit 52 reads the YUV image signal DIS indicative of the normal image NI and the YUV image signal DIS indicative of the blurred image BI from the work memory 59. Based on the read YUV image signals DIS, the image processing circuit 52 composes the normal image NI and the blurred image BI to generate the composite image CI. The image processing circuit 52 stores the YUV image signals DIS indicative of the generated composite image CI into the work memory 59. The composite image signal indicative of the composite image CI is then compressed by the JPEG converting circuit 55 and the compressed signal is stored in the work memory 59. The display controller 54 reads the composite image signal before compression from the work memory 59 and drives the LCD 80 based on the composite image signal. By the operation, the composite image CI is displayed on the LCD 80.

Figure 9:
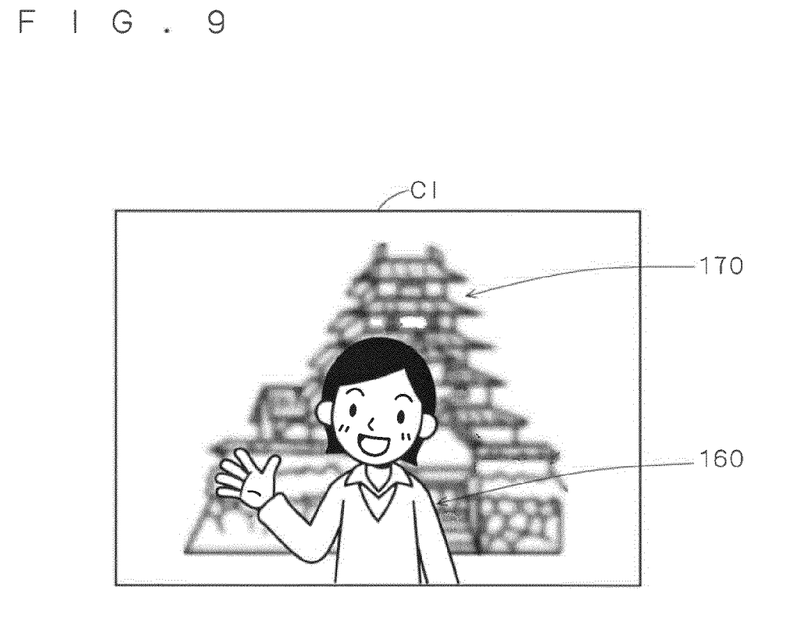
FIG. 9 is a diagram showing an example of a composite image.

FIG. 9 is a diagram showing an example of the composite image CI generated by the image processing circuit 52. As shown in FIG. 9, in the composite image CI, no-blurring occurs in the image of the person 150 displayed in the no-blurring subject designation area 100 but a blurring occurs in the background image. As described above, the composite image CI is constituted of a no-blurring area 160 in which a blurring is not intentionally caused, and a blurred area 170 in which a blurring is intentionally caused. The composite image CI is an image having the portrait effect.

In the first embodiment, at the time of composing the normal image NI and the blurred image BI, first, the normal image NI and the blurred image BI are virtually overlapped so as not to be deviated from each other. Then, the pixel signals of the pixels of the normal image NI and the pixels of the blurred image BI which are overlapped with each other are added to each other. Consequently, the pixels of the normal image NI and the pixels of the blurred image BI overlaid on the normal image NI are combined and a composite image signal indicative of the composite image CI is obtained. The pixel signal in the normal image NI is multiplied with a composition ratio which is set for a corresponding pixel, and the pixel signal in the blurred image BI is multiplied with a composition ratio which is set for a corresponding pixel. The resultant signals are added to each other. For example, in a case of adding a pixel signal in the normal image NI and a pixel signal in the blurred image BI, when it is assumed that the composition ratio of the pixel corresponding to the pixel signal in the normal image NI is set to 20% and the composition ratio of the pixel corresponding to the pixel signal in the blurred image BI is set to 80%, the pixel signal in the normal image NI is multiplied with 0.2, the pixel signal in the blurred image BI is multiplied with 0.8, and the resultant signals are added.

Figure 10:
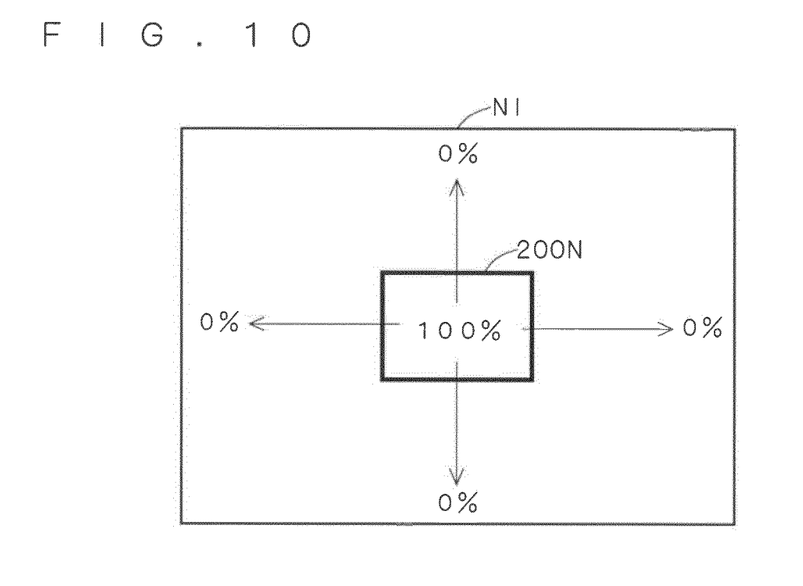
FIG. 10 is a diagram showing an example of setting of composition ratio in a normal image.
Figure 11:
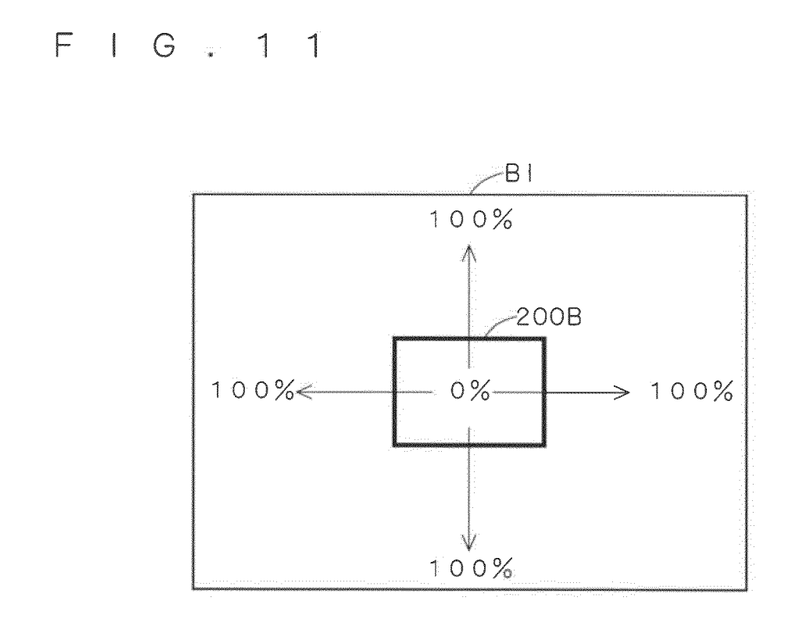
FIG. 11 is a diagram showing an example of setting of composition ratio in a blurred image.

FIG. 10 is a diagram showing the composition ratio set for the normal image NI. FIG. 11 is a diagram showing the composition ratio set for the blurred image BI. In the first embodiment, an image area in the normal image NI of a partial subject displayed in the no-blurring subject designation area 100 is an area 200N which is to be a no-blurring area of the composite image CI in the normal image NI. As shown in FIG. 10, in the normal image NI, the composition ratio of the area 200N which is to be the no-blurring area of the composite image CI is set to 100%. That is, the composition ratio of each of the pixels constituting the area 200N is set to 100%. The composition ratio in the area other than the area 200N in the normal image NI is set so as to decrease with distance from the area 200N. For example, the composition ratio of the area other than the area 200N in the normal image NI is set so as to change as 80%, 60%, 40%, 20%, and 0% with distance from the area 200N.

On the other hand, the composition ratio of the blurred image BI to be combined with the normal image NI is set so as to show a distribution tendency opposite to that of the composition ratio of the normal image NI. That is, in the blurred image BI, as shown in FIG. 11, the composition ratio of the area 200B overlapped with the area 200N in the normal image NI, that is, in the embodiment, the composition ratio of the image area of the partial subject displayed in the no-blurring subject designation area 100, in the blurred image BI is set to 0%. The composition ratio of the other area is set so as to increase with distance from the area 200B.

By combining the normal image NI and the blurred image BI as described above, the composite image CI having a natural portrait effect can be generated such that, a blurring hardly occurs in the image area of the partial subject displayed in the no-blurring subject designation area 100, and the degree of the blurring gradually increases with distance from the image area.

In the composite image CI shown in FIG. 9, a blurring occurs also in the image area of the background part displayed in the no-blurring subject designation area 100. As it can be understood from the above description, in reality, a blurring hardly occurs in the image area of the background part.

As described above, in the digital camera system of the first embodiment, the normal image NI in which a blurring is not intentionally caused and the blurred image BI in which a blurring is intentionally caused entirely are combined. Therefore, an image having the portrait effect can be generated.

Generally, an image capture area (a light reception area of the image sensor) of a digital still camera is smaller than that of a silver salt camera. Consequently, the depth of the subject is deep due to the limit of optical designing. Even if an aperture is provided and an f-number is increased, blurring of an image of a subject is suppressed in positions other than the focused point. Therefore, it is difficult to take an image having the portrait effect in which an area other than a certain image area is blurred by a digital still camera.

In the first embodiment, the normal image NI and the blurred image BI are combined, so that an image having the portrait effect can be easily generated.

Further, in the first embodiment, the blurred image BI is generated by using the function of changing the relative positional relation between the lens of the optical system 2 and the image sensor 3, of a general digital camera system. Consequently, as compared with the case of generating the blurred image BI by the image processing technique like the technique of Japanese Patent Application Laid-Open No. 11-224324, the blurred image BI can be generated without complicating the configuration of the digital camera system. Therefore, with the simple configuration, an image having the portrait effect can be generated.

As described above, the camera-shake correcting mechanism constituted of the actuator 5, the actuator driver 6, the sub-control circuit 7, and the acceleration sensor 8 can move the correction lens 2b in the XY plane perpendicular to the optical axis. Therefore, various blurred images BI having different degrees of blurring can be realized by using the camera-shake correcting mechanism.

For example, in a case of moving the correction lens 2b in the X-axis direction during exposure, a blurred image BI in which the subject is blurred in the horizontal direction can be obtained. By moving the correction lens 2b so as to draw a circle, a blurred image BI in which the subject is blurred along a circle is obtained.

By moving the correction lens 2b in the XY plane so that the relative speed between the correction lens 2b and the image sensor 3 changes during the exposure period by using the camera-shake correction mechanism, the degree of blurring can be changed in a single blurred image BI. For example, by moving the correction lens 2b slowly in a center portion of the image capture plane and moving the correction lens 2b quickly in a peripheral portion in the image capture plane, a blurred image BI which is not blurred so much in the center portion of an image but is blurred much in the peripheral portion of the image can be obtained.

In the first embodiment, by operating the operating part 70 to set the position and the range of the no-blurring subject designation area 100, the area 200N which is to be a no-blurring area in the normal image NI can be freely set. Therefore, the composite image CI desired by the user can be easily generated.

In the first embodiment, in the LCD 80, the no-blurring subject designation area 100 for designating a partial subject whose image area in the normal image NI is to be a no-blurring area in the composite image CI is displayed in a state where the entire subject to be imaged is displayed. Consequently, by referring to an image displayed on the LCD 80, the user can visually recognize which area is to be a no-blurring image in the normal image NI. Since the position and the range of the no-blurring subject designation area 100 can be changed by the operating part, an area which is to be a no-blurring area can be set while visually recognizing which area is to be a no-blurring area in the normal image NI. Therefore, the composite image CI desired by the user can be easily generated.

In the first embodiment, only one blurred image BI is captured and combined with the normal image NI. It is also possible to capture a plurality of blurred images BI having different degrees of blurring and combine each of the plurality of blurred images BI with the normal image NI, thereby generating a plurality of composite images CI having different degrees of blurring in blurred areas. In this case, the photographer can select any one of the plurality of generated composite images CI to be stored in the memory card 90 by operating the operating part 70.

It is also possible to make the photographer select the degree of blurring in a blurred area in the composite image CI in advance by operating the operating part 70, capture a blurred image BI according to the selected degree of blurring, and combine the blurred image BI and the normal image NI, thereby generating a composite image CI.

Although the camera-shake correction is performed by moving the correction lens 2b in the first embodiment, the camera-shake correction may be performed by moving the image sensor 3 in a plane perpendicular to the optical axis. By moving the image sensor 3 in the Z-axis direction in place of moving the focus lens 2c, the autofocus process may be performed. In these cases, the blurred image BI is generated by moving the image sensor 3.

Figure 12:
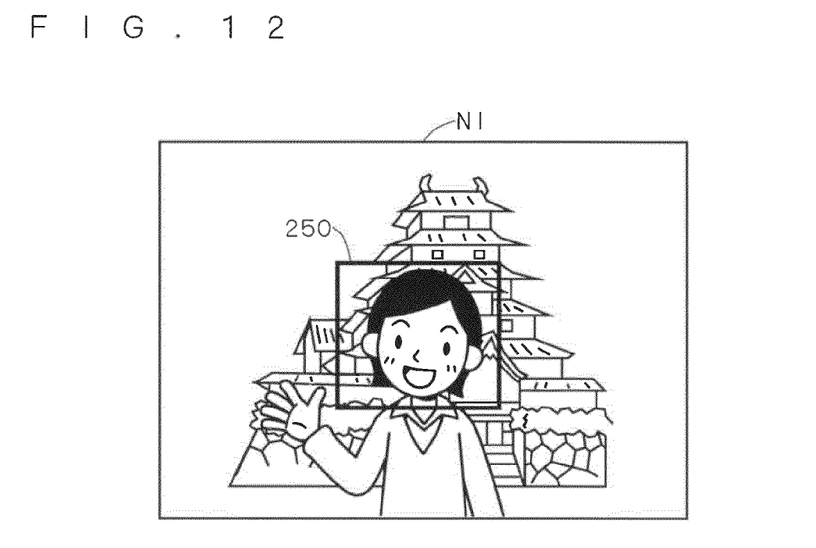
FIG. 12 is a diagram showing a face image area specified in a normal image.

As shown in FIG. 12, the image processing circuit 52 may perform face image recognition on the normal image NI, employ a face image area 250 specified by the face image recognition as the area 200N which is to be a no-blurring area in the composite image CI, set the composition ratio in the normal image NI in a manner similar to the above, and combine the normal image NI and the blurred image BI.

Figure 13:
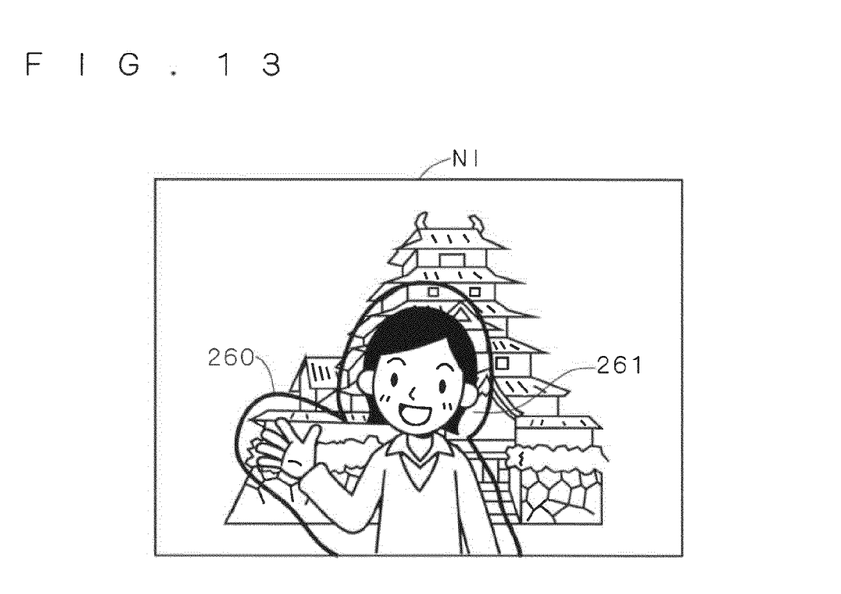
FIG. 13 is a diagram showing contour of an object image specified in a normal image.

As shown in FIG. 13, the image processing circuit 52 may perform a process of recognizing the contour of an object image such as a person image on the normal image NI, employ an area 261 inside a contour 260 of the object image specified by the process as an area 200N which is to be a no-blurring area in the composite image CI, set the composition ratio for the normal image NI in a manner similar to the above, and combine the normal image NI and the blurred image BI.

In the above example, by operating the operating part 70 to set the position and the range of the no-blurring subject designation area 100, the area 200N which is to be a no-blurring area in the composite image CI can be set in the normal image CI. Alternatively, a pre-fixed partial area in the normal image NI may be set as a no-blurring area in the composite image CI. In this case, at the time of capturing the normal image NI, the no-blurring subject designation area 100 whose position and range are fixed is displayed. By making an image area in a normal image of a partial subject in the no-blurring subject designation area 100 become a no-blurring area in the composite image CI, the photographer can visually recognize which area in the normal image NI becomes a no-blurring area.

After continuously capturing the normal image NI and the blurred image BI, the area 200N which is to be a no-blurring area in the normal image NI may be designated by operating the operating part 70. For example, after continuously capturing the normal image NI and the blurred image BI, a no-blurring area designation area whose position and range can be changed by the operating part 70 is displayed. An image area in the no-blurring area designation area is employed as the area 200N which is to be a no-blurring area of the composite image CI, and the normal image NI and the blurred image BI are combined.

Second Embodiment

Figure 14:
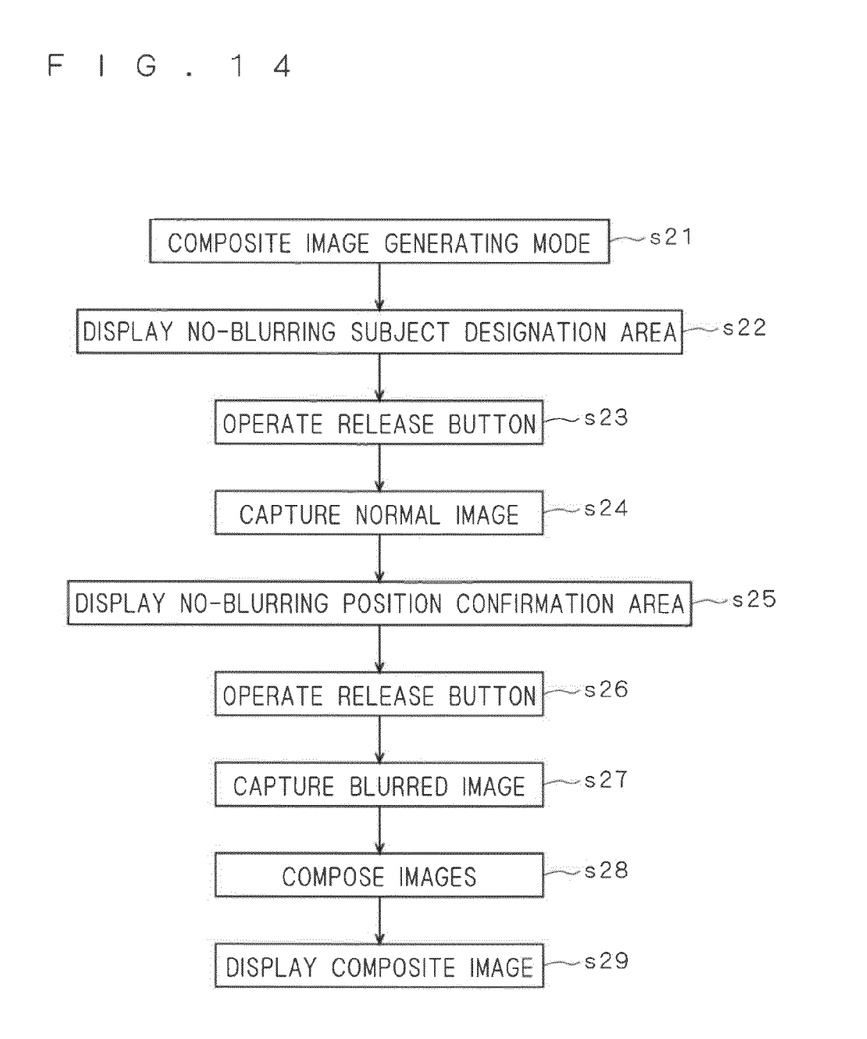
FIG. 14 is a flowchart showing a composite image generating process of a digital camera system according to a second embodiment of the present invention.

FIG. 14 is a flowchart showing a composite image generating process of a digital camera system according to a second embodiment of the present invention. In the digital camera system of the first embodiment, the normal image NI and the blurred image BI are continuously captured by a single press operation on the release button. In the digital camera system of the second embodiment, the normal image NI and the blurred image BI are captured by separate press operations on the release button.

As shown in FIG. 14, when a predetermined operation is performed on the operating part 70 in step s21, the digital camera system enters a composite image generating mode. When the digital camera system enters the composite image generating mode, in step s22, in a manner similar to the first embodiment, the no-blurring subject designation area 100 is displayed together with a subject to be imaged on the display screen 81 of the LCD 80.

Figure 7:
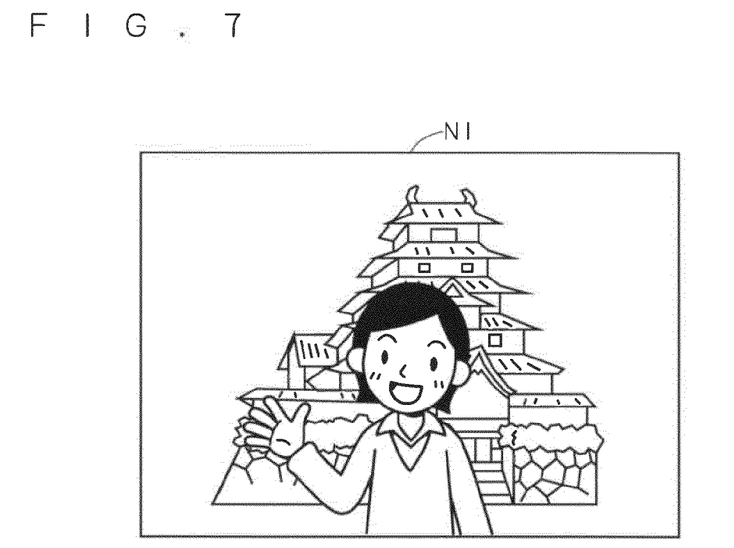
FIG. 7 is a diagram showing an example of a normal image.
Figure 15:
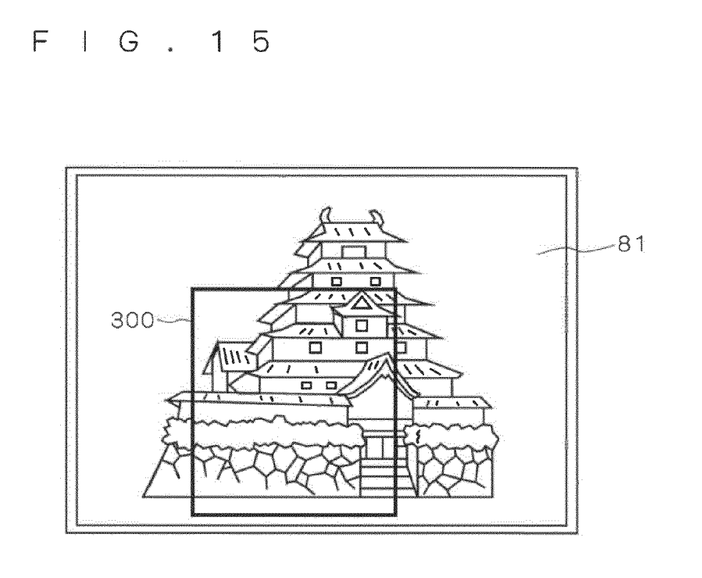
FIG. 15 is a diagram showing a display example of a subject and a no-blurring position confirmation area at the time of capturing a blurred image.

In step s23, the release button of the operating part 70 is pressed halfway down and then pressed all the way down. In step s24, in a manner similar to the first embodiment, the normal image NI as shown in FIG. 7 is captured. In step s25, the main control circuit 53 controls the display controller 54 to display a no-blurring position confirmation area 300 on the LCD 80. FIG. 15 is a diagram showing the state. In the example of FIG. 15, to capture a blurred image BI of only a background, a person lies out of the image capture range of the digital camera system. The no-blurring position confirmation area 300 is an area for confirming the image position of the no-blurring area in the composite image CI and is displayed in the same position and the same size as those of the no-blurring subject designation area 100 displayed at the time of capturing the normal image NI. Consequently, the photographer can visually recognize where the no-blurring area is disposed at the time of capturing the blurred image BI.

In step s26, the release button of the operating part 70 is pressed halfway down and then pressed all the way down. In step s27, the blurred image BI of only background is captured. At the time of capturing the normal image NI, when the release button is pressed halfway down, the exposure time is determined so that brightness of a captured image becomes appropriate. At the time of capturing the blurred image BI, the lenses of the optical system 2 have to be moved. Consequently, in consideration of time necessary for moving the lenses, exposure time longer than the inherent exposure time is employed. The camera-shake correction and the autofocus process are also not performed.

After the normal image NI of a person and a background and the blurred image BI of only the background are captured, in step s28, in a manner similar to the first embodiment, the normal image NI and the blurred image BI are combined. As a result, a composite image CI like that of FIG. 9 is generated. In step s29, the generated composite image CI is displayed on the LCD 80.

As described above, also in the case of capturing the normal image NI and the blurred image BI by the different press operations on the release button, by generating the composite image CI in a manner similar to the first embodiment, an image having the portrait effect can be obtained with the simple configuration.

The digital camera system of the second embodiment can also be variously modified in a manner similar to the first embodiment.

For example, in step s27, a plurality of blurred images BI having different degrees of blurring are captured by using the camera-shake correction mechanism. In step s28, each of the plurality of blurred images BI and the normal image NI are combined. In such a manner, a plurality of composite images CI having the different degrees of blurring in the blurred area may be generated.

It is also possible to make the photographer select the degree of blurring in a blurred area in the composite image CI in advance by operating the operating part 70, capture a blurred image BI according to the selected degree of blurring, and combine the blurred image BI and the normal image NI, thereby generating a composite image CI.

As shown in FIG. 12, face image recognition may be performed on the normal image NI, and the face image area 250 specified by the face image recognition may be employed as the area 200N as a no-blurring area in the composite image CI. In this case, prior to execution of step s25, the face image recognition is performed on the normal image NI. In step s25, the no-blurring position confirmation area 300 is displayed in the same position and the same size as that of the face image area specified by the recognition.

As shown in FIG. 13, the process of recognizing the contour of an object image is performed on the normal image NI. In step s28, the area 261 in the contour 260 of the object image specified by the process may be employed as an area 200N which is to be a no-blurring area in the composite image CI. In this case, prior to execution of step s25, the process of recognizing the contour of an object image is performed on the normal image NI. In step s25, the no-blurring position confirmation area 300 is displayed in the same position and the same size as that of the image area in the contour of the object image specified by the process.

A pre-fixed partial area in the normal image NI may be set as a no-blurring area in the composite image CI. After capturing the normal image NI and the blurred image BI, the area 200N which is to be a no-blurring area may be designated in the normal image NI by operating the operating part 70.

The overlap position between the normal image NI and the blurred image BI on generating the composite image CI may be designated by the operating part 70. In this case, various composite images CI can be generated.

For example, prior to execution of step s28, the normal image NI and the blurred image BI are displayed so as to be overlapped on the display screen 81 of the LCD 80, and the display position of at least one of the normal image NI and the blurred image BI is allowed to be changed by the operating part 70. In step s28, the normal image NI and the blurred image BI are combined in the overlap position of the normal image NI and the blurred image BI on the display screen 81 of the LCD 80.

In a case where the normal image NI and the blurred image BI are overlapped without being deviated, image composition is performed in a manner similar to the first embodiment.

Figure 16:
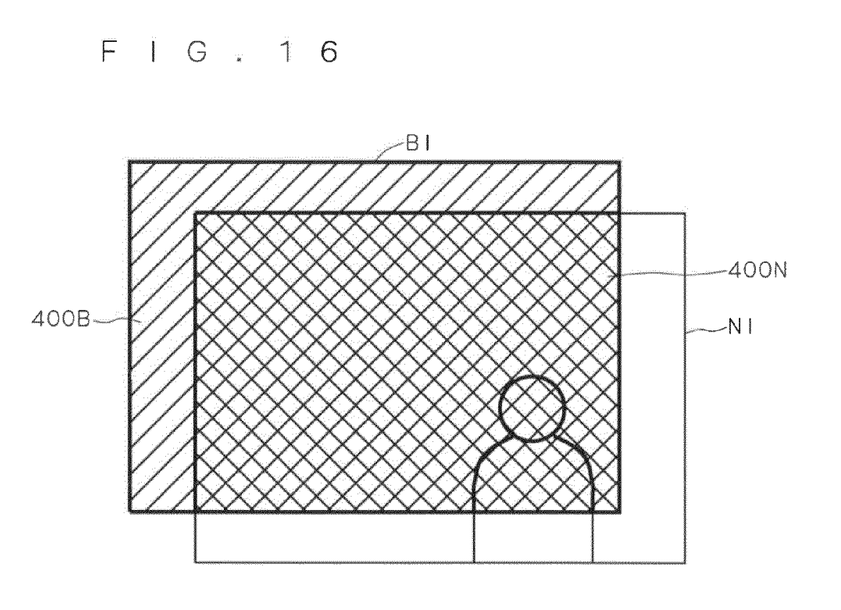
FIG. 16 is a diagram illustrating an image composing process in a case where a normal image and a blurred image are overlapped with a deviation.

On the other hand, in a case where the normal image NI and the blurred image BI are overlapped and deviated from each other, by combining an entire image area 400B of the blurred image BI and an image area 400N overlaid on the blurred image BI in the normal image NI, a composite image CI having the same image size as that of the normal image NI and the blurred image BI can be obtained. The composition ratio in this case is set in a manner similar to the above on the normal image NI. At the time of combining images, only the composition ratio of the image area 400N to be combined with the blurred image BI is used. In the blurred image BI, the composition ratio of the image area overlapped with the normal image NI is set so as to show a distribution tendency opposite to that of the composition ratio of the image area 400N. The composition ratio of an image area which is not overlapped with the normal image NI is set to 100%. As a result, a composite image CI which is intentionally partly blurred can be obtained.

Figure 17:
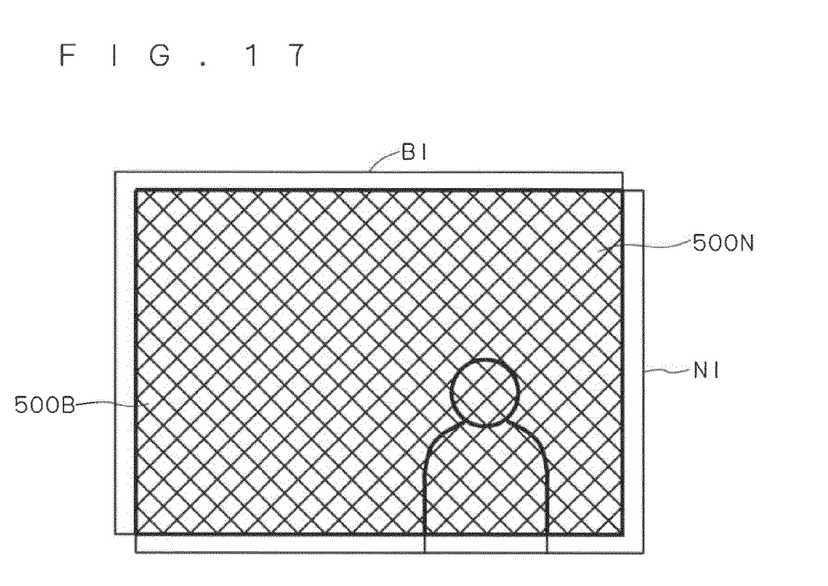
FIG. 17 is a diagram showing another example of the image composing process in the case where a normal image and a blurred image are overlapped with a deviation.

In a case where the normal image NI and the blurred image BI are overlapped and deviated, as shown in FIG. 17, an image area 500N overlapped with the blurred image BI in the normal image NI and an image area 500B overlapped with the normal image NI in the blurred image BI are combined to generate an intermediate composite image. A composite image CI may be generated by enlarging the end portion of the intermediate composite image so that the image size of the intermediate composite image becomes the same as that of the normal image NI and the blurred image BI.

In this case, when the size of an overlap area between the normal image NI and the blurred image BI is small, in the composite image CI, continuity between the areas of the enlarged end portion and the other area cannot be assured. Consequently, only in a case where the overlap area between the normal image NI and the blurred image BI becomes a certain size or larger, the composite image CI may be generated. When the size of the overlap area between the normal image NI and the blurred image BI is less than a predetermined size, an error message may be displayed on the LCD 80 to encourage the user to re-set the overlap position between the normal image NI and the blurred image BI.

While the invention has been shown and described in detail, the foregoing description is in all aspects illustrative and not restrictive. It is therefore understood that numerous modifications and variations can be devised without departing from the scope of the invention.

What is claimed is:

1. A digital camera system comprising:
an image capturing apparatus for capturing an image; and
an image processing apparatus for performing an imaging process on an image captured by the image capturing apparatus, wherein
said image capturing apparatus has an optical system including a lens and an image sensor for converting subject light incident via said optical system into an electric signal,
said image capturing apparatus captures a single blurred image in which a blurring is caused intentionally by changing a relative positional relation between said lens and said image sensor and also captures a single normal image in which a blurring is not caused intentionally separately from said single blurred image, wherein the blurred image is entirely blurred, and
said image processing apparatus combines said single normal image and said single blurred image after said image capturing apparatus separately captures said single normal image and said single blurred image, thereby generating a single composite image separate from said single normal image and said single blurred image having a no-blurring area in which a blurring is not intentionally caused and a blurred area in which a blurring is intentionally caused, the single composite image being generated based on a first composition ratio of the normal image and a second composition ratio of the blurred image, and the single composite image including a portion where each of the first composition ratio and the second composition ratio are nonzero.

2. The digital camera system according to claim 1, wherein said image capturing apparatus has a camera-shake correcting mechanism for performing a camera-shake correction by moving either said lens or said image sensor in a plane perpendicular to an optical axis, and
said image capturing apparatus captures said single blurred image by using said camera-shake correcting mechanism.

3. The digital camera system according to claim 2, wherein said camera-shake correcting mechanism moves either said lens or said image sensor in said plane so that relative speed between said lens and said image sensor changes in an exposure period for capturing said single blurred image.

4. The digital camera system according to claim 1, wherein said image capturing apparatus captures said single blurred image by intentionally obtaining defocusing by adjusting the relative positional relation between said lens and said image sensor.

5. The digital camera system according to claim 1, wherein said image capturing apparatus captures said single blurred image by performing an optical zoom process by moving said lens during an exposure period.

6. The digital camera system according to claim 1, wherein said image processing apparatus sets a preset fixed area in said single normal image as said no-blurring area.

7. The digital camera system according to claim 6, wherein said image processing apparatus decreases the first composition ratio of said single normal image when combined with said single blurred image, with distance from an area which is to be said no-blurring area in said single composite image.

8. The digital camera system according to claim 7, wherein the image processing apparatus decreases the first composition ratio of the normal image at first predetermined levels and increases the second composition ratio of the blurred image at second predetermined levels, when generating the composite image, based on a distance from an area which is to be the no-blurring area in the composite image to an edge of the composite image.

9. The digital camera system according to claim 1, further comprising:
an operating part for designating a partial area of said single normal image which is to be said no-blurring area in said image processing apparatus.

10. The digital camera system according to claim 9, wherein said image processing apparatus decreases the first composition ratio of said single normal image when combined with said single blurred image, with distance from an area which is to be said no-blurring area in said single composite image.

11. The digital camera system according to claim 9, wherein an overlap position between said single normal image and said single blurred image on generating said composite image in said image processing apparatus can be designated by said operating part.

12. The digital camera system according to claim 1, further comprising:
a display portion for displaying a whole subject whose image is taken by said image capturing apparatus,
wherein when said single normal image is captured by said image capturing apparatus, in a state where said whole subject is displayed, said display portion displays a designation area for designating a partial subject whose image area in said single normal image is to be said no-blurring area.

13. The digital camera system according to claim 12, further comprising:
an operating part for changing at least one of position and range of said designation area displayed on said display portion.

14. The digital camera system according to claim 13, wherein an overlap position between said single normal image and said single blurred image on generating said composite image in said image processing apparatus can be designated by said operating part.

15. The digital camera system according to claim 12, wherein said image processing apparatus decreases the first composition ratio of said single normal image when combined with said single blurred image, with distance from an area which is to be said no-blurring area in said single composite image.

16. The digital camera system according to claim 1, further comprising:
a display portion for displaying an image captured by said image capturing apparatus, said display portion displaying a designation area for designating an area which is to be said no-blurring area in said single normal image in a state where said single normal image is displayed; and
an operating part for changing at least one of position and range of said designation area displayed on said display portion.

17. The digital camera system according to claim 16, wherein said image processing apparatus decreases the first composition ratio of said single normal image when combined with said single blurred image, with distance from an area which is to be said no-blurring area in said single composite image.

18. The digital camera system according to claim 16, wherein an overlap position between said single normal image and said single blurred image on generating said composite image in said image processing apparatus can be designated by said operating part.

19. The digital camera system according to claim 1, wherein said image processing apparatus performs face image recognition on said single normal image and sets a face image area specified by said face image recognition as said no-blurring area.

20. The digital camera system according to claim 19, wherein said image processing apparatus decreases the first composition ratio of said single normal image when combined with said single blurred image, with distance from an area which is to be said no-blurring area in said single composite image.

21. The digital camera system according to claim 1, wherein said image processing apparatus performs a process of recognizing a contour of an object image on said single normal image and sets an area inside said contour of said object image specified by said process as said no-blurring area.

22. The digital camera system according to claim 21, wherein said image processing apparatus decreases the first composition ratio of said single normal image when combined with said single blurred image, with distance from an area which is to be said no-blurring area in said single composite image.

23. The digital camera system according to claim 1, further comprising:

an operating part for designating an overlap position between said single normal image and said single blurred image on generating said composite image in said image processing apparatus.

* * * * *